(12) United States Patent
Dirksen

(10) Patent No.: US 10,337,313 B2
(45) Date of Patent: Jul. 2, 2019

(54) INTEGRATED WELL SURVEY MANAGEMENT AND PLANNING TOOL

(71) Applicant: HALLIBURTON ENERGY SERVICES, INC., Houston, TX (US)

(72) Inventor: Ronald Johannes Dirksen, Spring, TX (US)

(73) Assignee: Halliburotn Energy Services, Inc., Houston, TX (US)

( * ) Notice: Subject to any disclaimer, the term of this patent is extended or adjusted under 35 U.S.C. 154(b) by 334 days.

(21) Appl. No.: 15/021,552

(22) PCT Filed: Oct. 8, 2013

(86) PCT No.: PCT/US2013/063815
§ 371 (c)(1),
(2) Date: Mar. 11, 2016

(87) PCT Pub. No.: WO2015/053747
PCT Pub. Date: Apr. 16, 2015

(65) Prior Publication Data
US 2016/0230539 A1    Aug. 11, 2016

(51) Int. Cl.
| | | |
|---|---|---|
| E21B 47/024 | (2006.01) |
| E21B 47/022 | (2012.01) |
| G01V 99/00 | (2009.01) |
| E21B 44/00 | (2006.01) |
| E21B 7/06 | (2006.01) |

(52) U.S. Cl.
CPC ............ *E21B 47/024* (2013.01); *E21B 7/06* (2013.01); *E21B 44/00* (2013.01); *E21B 47/022* (2013.01); *G01V 99/005* (2013.01)

(58) Field of Classification Search
CPC combination set(s) only.
See application file for complete search history.

(56) References Cited

U.S. PATENT DOCUMENTS 6,577,954 B2    6/2003  Alft et al.
6,749,029 B2    6/2004  Alft et al.
(Continued)

FOREIGN PATENT DOCUMENTS

| CA | 2923543 A1 | 4/2015 |
| CN | 101012745  | 5/2012 |

(Continued)

OTHER PUBLICATIONS

Isachenko, V. H., "Directional Survey," Translation of Russian-language scientific book, Publishing house "Nedra", 1987, 4 pages.
(Continued)

*Primary Examiner* — Mamadou L Diallo
(74) *Attorney, Agent, or Firm* — Jason Sedano; Parker Justiss, P.C.

(57) ABSTRACT

In one example, an integrated well survey management and planning tool is implemented by a computer system. The tool can receive survey data describing a well being drilled from a surface to a subterranean geological target to be reached by drilling the well. The well is associated with a target trajectory on which the well is to be drilled from the surface to the subterranean geological target. Based, at least in part, on the survey data and the target trajectory, the tool determines an uncertainty indicator indicating an uncertainty in drilling the well on the target trajectory, and displays the uncertainty indicator in a user interface.

18 Claims, 5 Drawing Sheets

(56) References Cited

U.S. PATENT DOCUMENTS

| | | | |
|---|---|---|---|
| 6,757,613 | B2 | 6/2004 | Chapman et al. |
| 7,539,625 | B2 | 5/2009 | Klumpen et al. |
| 7,596,481 | B2 | 9/2009 | Zamora et al. |
| 7,814,989 | B2 | 10/2010 | Nikolakis-Mouchas et al. |
| 8,103,493 | B2 | 1/2012 | Sagert et al. |
| 8,199,166 | B2 | 6/2012 | Repin et al. |
| 8,352,226 | B2 | 1/2013 | Cullick et al. |
| 2003/0121657 | A1 | 7/2003 | Chia et al. |
| 2005/0154532 | A1* | 7/2005 | Close ............... E21B 47/022 702/6 |
| 2005/0209866 | A1 | 9/2005 | Veeningen et al. |
| 2007/0199721 | A1 | 2/2007 | Givens et al. |
| 2009/0120690 | A1 | 5/2009 | Phillips |
| 2009/0152005 | A1 | 6/2009 | Chapman et al. |
| 2009/0288881 | A1 | 11/2009 | Mullins et al. |
| 2010/0241410 | A1 | 9/2010 | McElhinney et al. |
| 2012/0147006 | A1 | 6/2012 | Rothnemer |
| 2014/0166274 | A1* | 6/2014 | Weiner ............... G01N 27/12 166/250.02 |
| 2017/0293848 | A1* | 10/2017 | Sorden ............... G06N 5/04 |

FOREIGN PATENT DOCUMENTS

| | | |
|---|---|---|
| RU | 2157445 C2 | 10/2000 |
| RU | 67635 U1 | 5/2007 |
| WO | WO2005/001661 | 1/2005 |

OTHER PUBLICATIONS

Bergstrom, "Pad Drilling Using Magnetic MWD," Devon Energy, ISCWA SPE Wellbore Positioning Tech Section, Denver, Nov. 3, 2011, 32 pages.

Halliburton, "Wellbore Survey Quality Considerations," Sperry Drilling Services, 2009, 25 pages.

PCT International Search Report and Written Opinion of the International Searching Authority, PCT/US2013/063815, dated Jun. 25, 2014, 11 pages.

Williamson, "Accuracy Prediction for Directional Measurement while Drilling", vol. 15, No. 4, Dec. 1, 2000, 13 pages.

Sagert et al., U.S. Provisional Patent Application entitled "System and Method for Performing Oilfield Operations", Sep. 29, 2007, 71 pages.

\* cited by examiner

INTEGRATED WELL SURVEY
MANAGEMENT AND PLANNING TOOL

This application is a U.S. National Phase Application under 35 U.S.C. § 371 and claims the benefit of priority to International Application Serial No. PCT/US2013/063815, filed on Oct. 8, 2013, the contents of which are hereby incorporated by reference.

TECHNICAL FIELD

This disclosure relates to well survey management and planning.

BACKGROUND

A well plan describes the well trajectory to be followed to to take a well successfully from its surface position to the end of the well trajectory. Based on factors such as an expected use of a well (e.g., observation, production, injection, or multi-purpose well), parameters (e.g., production parameters, completion requirements, well dimensions, location), an expected life of the well, and conditions of the geological target (e.g., the subterranean reservoir) to be reached by the well, and other factors, the well plan outlines well objectives to be achieved during well drilling and well use. When drilling commences based on the well plan, the well can be periodically surveyed to obtain information describing the well being drilled and the obtained information interpreted, e.g., to compare a planned position and a determined position of the well. An operator can respond to deviations between the planned position and the determined position, e.g., by adjusting the drilling operations or by re-defining the well objectives (or both).

DESCRIPTION OF DRAWINGS

Like reference symbols in the various drawings indicate like elements.

DETAILED DESCRIPTION

This disclosure describes an integrated well survey management and planning tool. The tool can be implemented as a comprehensive, interactive survey management computer software application that can enable better planning and evaluation of survey strategy. The tool can bring different aspects of survey management, e.g., outputs determined by different survey tools that need to be considered during planning and executing a well into a single interactive environment. By implementing the tool, results of some analysis and actual interference effects can be viewed during the planning stage and the execution stage, respectively.

Figure 1:
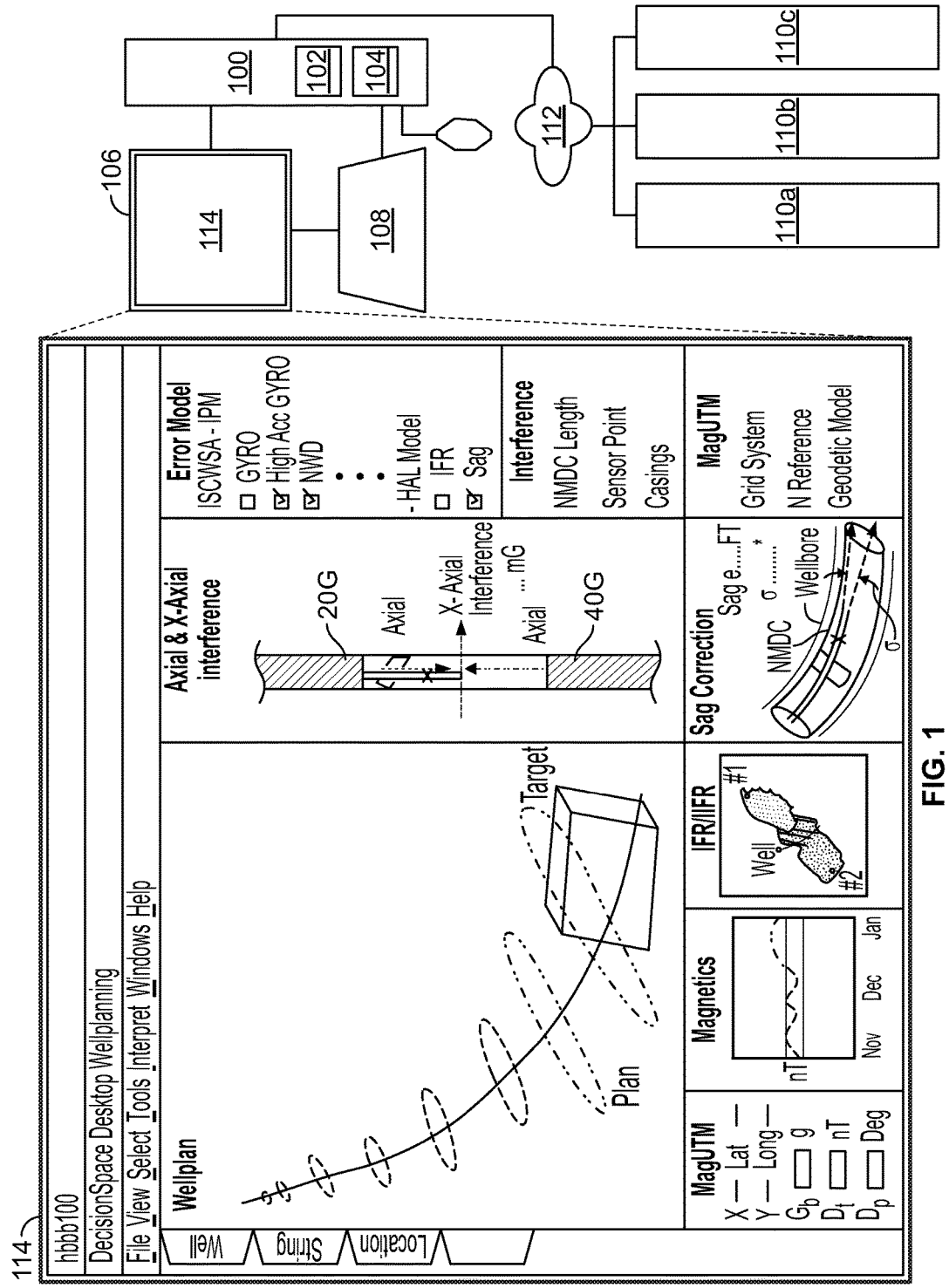
FIG. 1 illustrates an example computer system to implement an integrated well survey management and planning tool.

As described below, the tool can display multiple elements that affect well planning and surveying in a single interactive user interface on a display device. The interactive user interface can display the effect of a change in one parameter on other parameters, as applicable. Based on the outputs displayed in the user interface, an operator can adjust the choice of survey tools resulting in a well survey that achieves the well objectives, e.g., drill a well that reaches the intended geological target. In this manner, the tool can be implemented as an all-in-one interactive tool that can illustrate and optimize a survey for a well, platform, pad or field. For example, the tool can enable implementing as few surveys as necessary with survey tools that are as inexpensive as practicable. The tool can be implemented before or after commencing drilling operations (or both). Implementing the tool can enable operators to match the survey program with well objectives. The tool can be used to perform what-if analysis to determine the optimum length of non-magnetic material required in the BHA and to monitor the effects of variations in the earth magnetic field, due to solar storms for instance, on survey accuracy and allow for early determination if re-surveying is needed. Also the tool allows for the instantaneous verification that the correct earth magnetic model is being used and that the input variables are correct, the same applies for the declination correction being applied. FIG. 1 illustrates an example computer system 100 to implement the integrated well survey management and planning tool. In some implementations, the tool can be implemented as a computer software application including computer instructions stored on a computer-readable medium 102 and executable by data processing apparatus 104 (e.g., one or more computer processors). The computer system 100 can be connected to a display device 106 and to one or more input devices 108 (e.g., a mouse, a keyboard, a touchscreen, a stylus, an audio input device, or other input devices). In some implementations, the computer system 100 can be a desktop computer, a laptop computer, a tablet computer, a smartphone, a personal digital assistant, a client computer of a server-client computer system, or other computer system.

The computer system 100 can be connected to one or more well survey and planning computer systems (e.g., a first computer system 110*a*, a second computer system 110*b*, a third computer system 110*c*) over one or more wired or wireless networks 112 (e.g., a local area network, a wide area network, the Internet). Each well survey and planning computer system can execute a respective well survey and planning computer software application that receives survey information obtained from survey tools connected to each well survey and planning computer system. The computer system 100 can receive the survey information from the well survey and planning computer software applications over the one or more wired or wireless networks 112. In some implementations, the one or more well survey and planning computer systems can be implemented as entities that are separate from the computer system 100 that implements the integrated well survey management and planning tool. Alternatively, the computer system 100 can implement the computer software applications implemented by each of the one or more well survey and planning computer systems.

Figure 2:
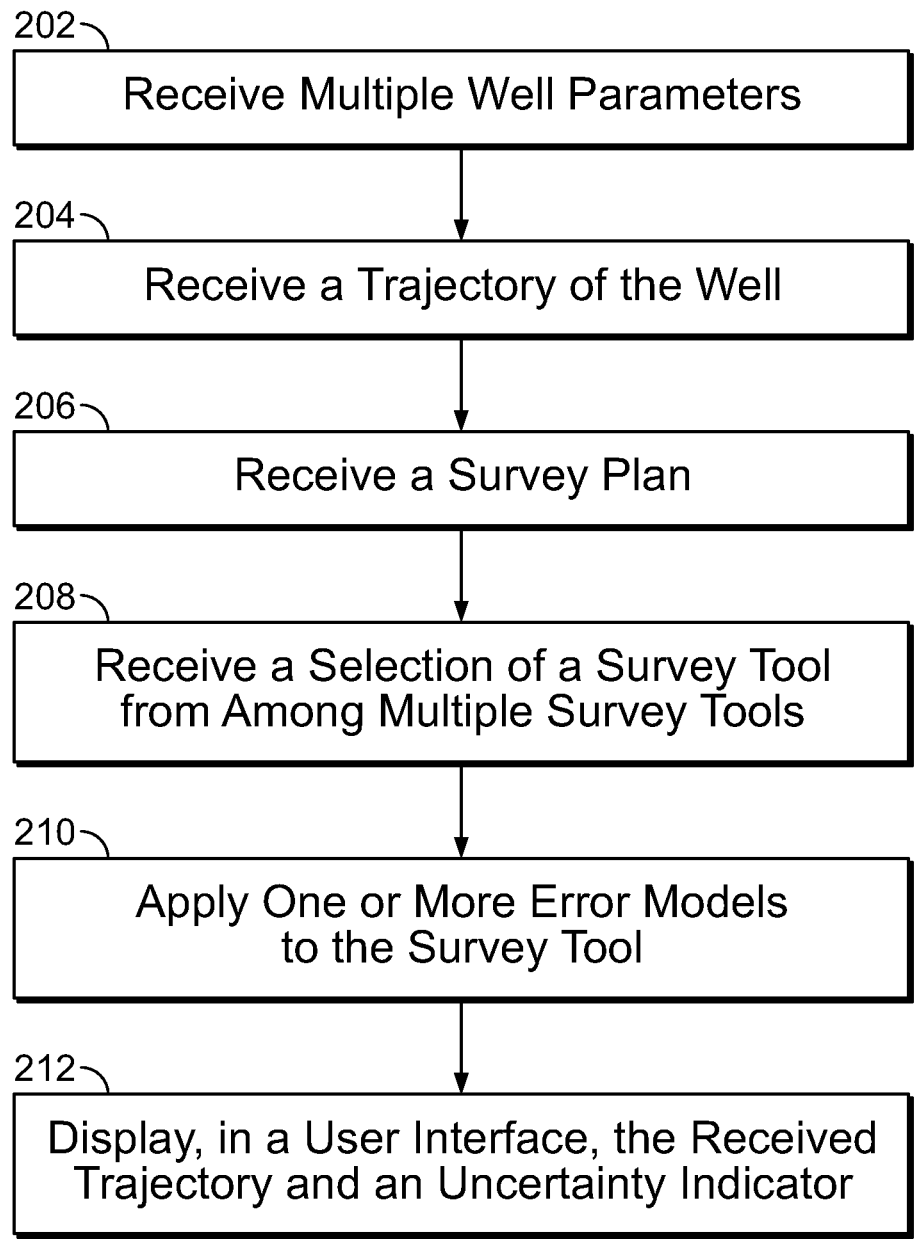
FIG. 2 is a flowchart of an example process to implement the integrated well survey management and planning tool during a planning stage.

FIG. 2 is a flowchart of a process 200 to implement the integrated well survey management and planning tool during a planning stage, i.e., before drilling commences. In some implementations, the computer system 100 can implement the process 200. At 202, the computer system 100 can receive multiple parameters. For example, the parameters can describe a location and a shape of a well and can be received, e.g., from a well operator. At 206, the computer system 100 can receive a survey plan indicating the number, position and survey type of surveys to be performed on the well while drilling the well.

At 204, the computer system 100 can receive a trajectory of the well from a surface to a subterranean geological target to be reached by drilling the well. For example, an operator can provide the trajectory as an input to the computer system 100. Alternatively, another computer system, which stores the trajectory, can provide the trajectory as an input to the computer system 100. At 208, the computer system 100 can receive a selection of a survey tool from among multiple survey tools. A survey tool can be a physical type of surveying tool that can be carried into the well. For example, the tool can be carried into the well on a wire (e.g., a wireline, e-line, or other tool) or tubing. The survey tool can measure the location in three-dimensional space of the well. For example, either the computer system 100 or one or more of the well survey and planning computer systems (or both) can be connected to the survey tool that surveys the well to be drilled along the received trajectory. In some implementations, the computer system 100 can also receive the number, position and survey type of surveys to be performed on the well while drilling the well.

At 210, the computer system 100 can apply multiple error models to the survey tool. An error model can be implemented as a computer software application as computer instructions stored on the computer-readable medium 102 and executable by the data processing apparatus 104. Each error model can define a respective uncertainty in reaching the subterranean geological target by drilling the well along the received trajectory. Some error models can determine the respective uncertainty by accounting for influences of different error sources. In some implementations, the computer system 100 can receive the error models, e.g., as inputs from an operator or from another computer system (or both). At 212, the computer system 100 can display, in a user interface 114 (e.g., displayed in the display device 106), the multiple parameters, the received trajectory of the well, an identifier identifying the survey tool and an uncertainty indicator determined by applying the one or more error models. The uncertainty indicator indicates an uncertainty in drilling the well on the received trajectory.

The uncertainty indicator represents a combination of respective uncertainties defined by the multiple error models. In other words, the uncertainty indicator is an uncertainty of the well that represents a combination of uncertainties of each survey and spacing between the surveys. For example, each of multiple survey tools that are (or can be) implemented during a well survey is associated with a respective uncertainty. The uncertainty indicator described in this disclosure represents a combination of the multiple uncertainties associated with the multiple survey tools. The computer system 100 can determine the uncertainty indicator based, in part, on the locations of the survey tools. The uncertainty represented by the uncertainty indicator is more than the uncertainty in the accuracy of the tool itself. The uncertainty in the accuracy of the tool is determined by errors in the tool's ability to make measurements. In addition to the uncertainty of the tool, the uncertainty for the well represented by the uncertainty indicator represents an uncertainty in drilling the well along the target trajectory without being able to see the three-dimensional drilling space, i.e., without survey points and using measurements made by the survey tools during the previous survey. The uncertainty represented by the uncertainty indicator can increase as a time between successive surveys increases because the possible error builds. In some implementations, the uncertainty indicator can be determined based on the intended well trajectory and the survey tools that will be used (and the locations of the survey tools). The operator can then plan more or fewer survey points, different survey points, different survey tools (or combinations of them) based on a confidence (provided by the uncertainty indicator) that the well will hit the geological target.

In this manner, the computer system 100 can provide the user interface 114 as a comprehensive, interactive survey management module. The operator can use the user interface 114 to evaluate an effect of different numbers, positions and survey types of surveys that affect the uncertainty indicator. The operator can also use the user interface 114 to evaluate an effect of different error models and combinations of error models, measurement corrections (e.g., sag correction), drill string configuration (e.g., the NMDC), well configurations and factors including well location and drilling time of the year. For example, the computer system 100 can provide each of the factors that affect the uncertainty indicator as a selectable option in the user interface 114. The operator can create combinations of selectable options (e.g., a combination of a first error model, a first correction, a first drill string configuration, a first location, a first drilling time, another combination of first and second error models, no correction, a second drill string configuration, the first location, a second drilling time, or other combinations) to determine the uncertainty indicator. In this manner, the operator can select/unselect available options and determine an effect on the uncertainty indicator. The operator can use the tool implemented by the computer system 100 to determine a survey program (i.e., the number, position and survey types) that will enable the operator to drill a well that will reach the geological target.

In the planning stage, the computer system 100 can receive the multiple parameters, receive the trajectory of the well, receive the selection of the survey tool, apply the one or more error models and display the multiple well survey parameters before the well is drilled along the received trajectory. In an execution stage, the computer system 100 can additionally receive actual drilling data and show the trajectory based on actual drilling data, as described below.

Figure 3:
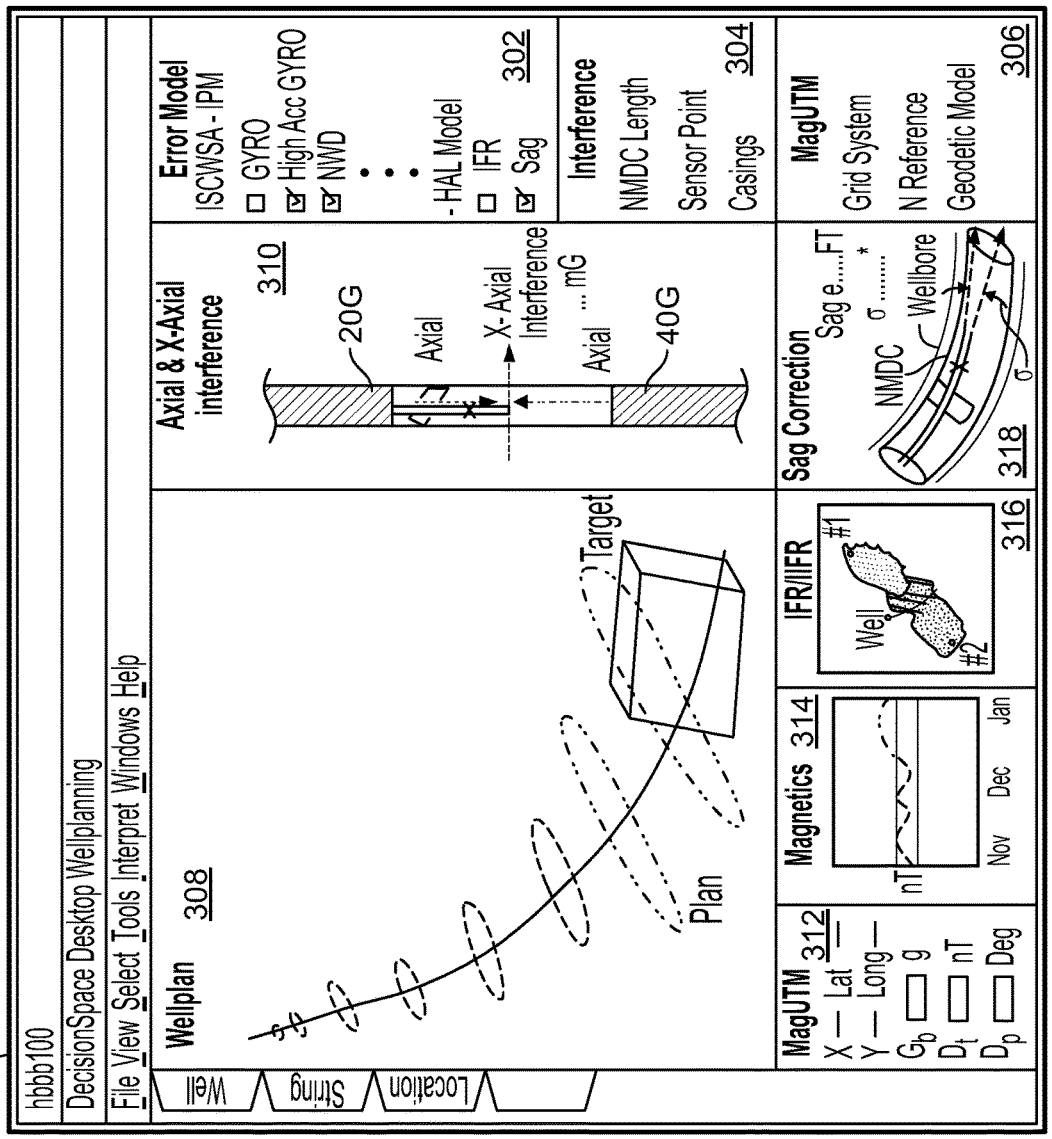
FIG. 3 illustrates an example user interface provided by the example computer system of FIG. 1 in response to implementing the integrated well survey management and planning tool.

FIG. 3 is an example of the user interface 114 provided by the computer system 100 in response to executing the integrated well survey management and planning tool. The user interface 114 includes multiple regions. In each region, the computer system 100 displays either an input to or an output of the integrated well survey management and planning tool implemented by the computer system 100. In some implementations, the user interface 114 includes a region 304 in which the computer system 100 displays multiple parameters, e.g., a length of a non-magnetic drill collar (NMDC) to be positioned in the well, a sensor position in the NMDC at which a survey tool is to be positioned, and casing information describing at least one of a casing size, distance, or direction from the sensor position. The computer system 100 can receive the multiple parameters, which can also include a location and a shape of the well, either from an operator of the computer system 100 or from one of the well survey and planning computer systems.

The user interface 114 includes a region 308 in which the computer system 100 displays the trajectory of the well from the surface to the subterranean geological target based, in part, on the parameters. In the region 308, the computer system 100 can also display the uncertainty indicator described above. In some implementations, the computer system 100 can display the uncertainty indicator as including multiple ellipses, each occupying a different area. As described above, each ellipse represents a combination of uncertainties associated with different multiple survey tools. A change in an uncertainty associated with information obtained by one of the survey tools affects an uncertainty associated with information obtained by another of the survey tools. Each ellipse of the multiple ellipses accounts for the different uncertainties associated with the different survey tools. For example, an area occupied by each ellipse is a measure of uncertainty in drilling on the target trajectory at a respective depth that cannot be visualized by relying on survey points obtained from the survey tools during a previous survey. In addition, each ellipse is associated with a respective depth of the well from the surface to the subterranean geological target. The computer system 100 can display the multiple ellipses at multiple respective depths along the trajectory in the region 308 of the user interface 114.

In some implementations, the computer system 100 can determine a confidence level for each ellipse that represents a confidence that an actual trajectory of the drilled well will match the predicted trajectory. The computer system 100 can determine the confidence level for each ellipse based, in part, on uncertainties associated with the information obtained by the survey tools, as described above. The computer system 100 can additionally determine an uncertainty threshold at a respective depth that represents an acceptable deviation between the actual and predicted trajectories. The uncertainty threshold is a potential uncertainty that is so great that the target trajectory could possibly miss the geological target. The computer system 100 can also determine whether the possible actual trajectory will reach the geological target. The computer system 100 can determine that a first ellipse at a first depth does not satisfy an uncertainty threshold at that depth. In response, the computer system 100 can display the first ellipse in the region 308 in a manner that is visually distinguishable from a second ellipse that satisfies the uncertainty threshold at a second depth. For example, the computer system 100 can display ellipses that satisfy respective uncertainty thresholds in a color (e.g., green) and ellipses that do not satisfy the respective uncertainty thresholds in another color (e.g., red).

In some implementations, multiple survey tools can be available and can be connected to (e.g., operated by) the well survey and planning computer systems. The operator of the computer system 100 can select one or more survey tools, which can include, e.g., a single shock magnetic survey tool, a MWD magnetic survey tool with multi-shock type survey, or other survey tools. If the inaccuracies determined for the survey tools are higher than acceptable thresholds, then additional corrections can be applied. The corrections can include, e.g., SAG corrections to correct errors in the alignment of the survey tool, corrections to correct errors associated with the presence of magnetic components in the drill string, corrections due to earth's magnetic field based on geographic location (e.g., closer to the north or south poles), and other corrections.

As described above, the computer system 100 can receive a selection of one or more survey tools, e.g., from a user of the computer system 100 or from one or more of the well survey and planning computer systems. In addition, the computer system 100 can receive one or more error models to be applied to the selected survey tool through the user interface 114. For example, the user interface 114 can include a region 302 in which the computer system 100 displays multiple error models including, e.g., at least one of an interpolation in-field referencing (IIFR) model, an in-field referencing (IFR) model, and a measurement while drilling (MWD) model. In this region, the user interface 114 can also include a correction applied to the readings, e.g., a sag correction. A user of the computer system 100 can select one or more of the error models through the user interface 114. The computer system 100 can apply the selected one or more error models to the selected survey tool. In some implementations, the computer system 100 can include an "Accuracy" field that specifies an acceptable deviation (e.g., 1-sigma, 2-sigma, 3-sigma) in the region 302. The computer system 100 can apply the selected one or more error models to the selected survey tool to determine that the errors fall within the deviation specified in the "Accuracy" field.

In some implementations, the multiple parameters can include a geographic location at which the well is to be drilled and a drilling time, i.e., a time of the year when drilling operations are to be performed. A well survey and planning computer system can implement a geodetic model that can determine the earth's gravitational field and magnetic field strength at the location and at the drilling time. The user interface 114 can include a region 306 in which the computer system 100 displays an identifier identifying the geodetic model. The user interface 114 can also include a region 312 in which the computer system 100 can display the earth's gravitational field strength and magnetic field strength, and a dip angle of the magnetic field.

In some implementations, the multiple parameters can include magnetics representing variations in the earth's magnetic field due to solar effects during the drilling time. The user interface 114 can include a region 314 in which the computer system 100 displays the magnetics during the drilling time. For example, one of the well survey and planning computer systems can determine and provide the magnetics to the computer system 100 for display in the region 314. The computer system 100 can display a plot of the magnetics over a time that includes the drilling time in the region 314. Either the computer system 100 or a well survey and planning computer system can compare the magnetics with a threshold magnetics for drilling the well. In some implementations, the computer system 100 can display the magnetics at a particular time that satisfy the threshold magnetics to be visually distinguishable from magnetics at a different time that does not satisfy the threshold magnetics. For example, the computer system 100 can display the magnetics that satisfy the threshold magnetics in a first color (e.g., green) and the magnetics that do not satisfy the threshold magnetics in a second, different color (e.g., red). Moreover, some of the survey tools measure orientation relative to the earth's magnetic field. The computer system 100 can account for the effect of the magnetics on the readings of the magnetic survey tools.

Additional survey and planning information that the computer system 100 can display in the user interface 114 can include an image of a SAG correction for the well (e.g., in a region 318), an axial and cross-axial interference (e.g., in a region 310) representing a disturbance in a magnetic field due to low magnetic permeability components in the well, and an output of the IFR/IIFR error models (e.g., in a region 316). As described above, the user interface 114 is interactive. For example, when the computer system 100 receives a change to an uncertainty defined by an error model (or any input to the integrated well survey management and planning tool) that results in a change to an uncertainty defined by another error model, the computer system 100 can automatically and without user intervention update the uncertainty indicator (or any other aspect of the well plan or survey displayed in the user interface 114). The computer system 100 can display the updated uncertainty indicator in the user interface 114. An operator of the computer system 100 can make changes and see, e.g., in real time or near real time, an effect of the changes on the ellipse. In this manner, the operator can create different scenarios while designing the well survey plan.

The techniques described above related to implementing the integrated well survey management and planning tool during the planning stage of well. After drilling has commenced, one or more survey tools can be implemented to monitor the drilling operation as described below with reference to FIG. 4. The computer system 100 can implement the integrated well survey management and planning tool to receive information determined by the one or more survey tools, and, in real time, update appropriate regions in the user interface 114. By doing so, the operator can compare the actual drilling information with the predicted drilling information, and make adjustments as necessary, e.g., to the drilling conditions, the survey tools, the error models (or combinations of them). In addition, the operator can visualize an effect of the actual drilled well on the ellipses. For example, if the as-drilled well lands at a center of a predicted ellipse, the subsequent ellipses over undrilled portions will not be as large as predicted.

Figure 4:
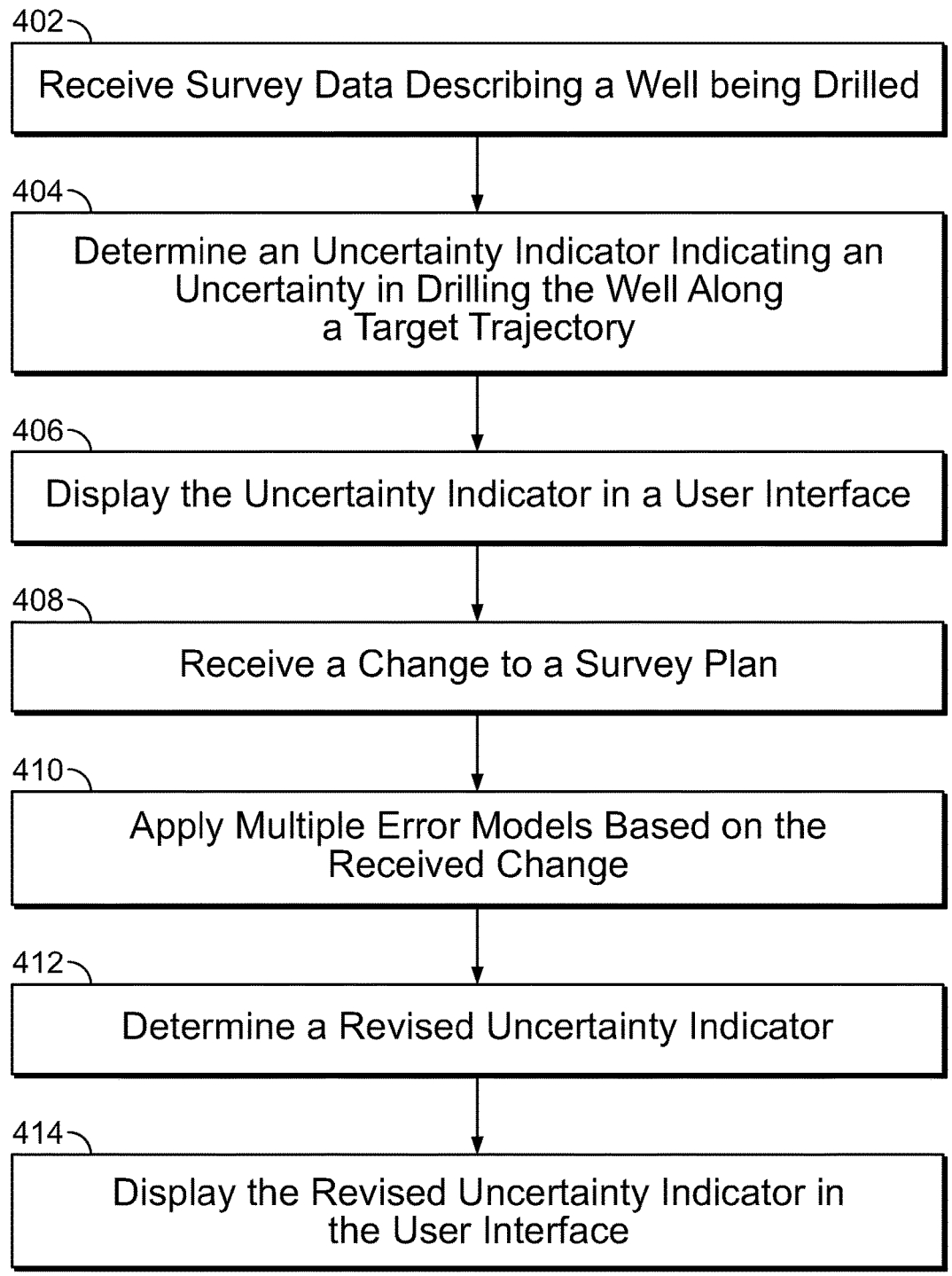
FIG. 4 is a flowchart of an example process to implement the integrated well survey management and planning tool during an execution stage.

FIG. 4 is a flowchart of an example process to implement the integrated well survey management and planning tool during an execution stage. In some implementations, the computer system 100 can implement the process 400. At 402, the computer system 100 can receive survey data describing a well being drilled. For example, after the well drilling has commenced, a survey tool positioned at a location between the surface and the geological target to be reached by drilling the well can be implemented to obtain survey data that includes a trajectory of the well being drilled. The survey tool can be moved to different locations in the well. For example, after drilling for a certain period, drilling can be stopped and the survey tool, which can be near the drill bit, can be operated to take a survey. As described above, the computer system 100 can receive a target trajectory along the well to be drilled to the geological target. At 404, the computer system 100 can determine an uncertainty indicator indicating an uncertainty in drilling the well on a target trajectory. For example, the computer system 100 can determine the uncertainty indicator based at least in part on the survey data and the target trajectory. The uncertainty indicator can indicate an uncertainty (e.g., a confidence measure) in reaching the geological target by drilling the well along the target trajectory.

At 406, the computer system 100 can display the uncertainty indicator in a user interface, e.g., in the user interface 114. As described above, in certain (but not all) instances, the computer system 100 can have previously determined an uncertainty indicator for the well during a planning stage, i.e., before drilling commences. By implementing process 400, the computer system 100 can determine a revised uncertainty indicator for the well based, in part, on survey data that describe the well being drilled. The revised uncertainty indicator measured during the drilling stage, therefore, is an update to the uncertainty indicator determined during the planning stage. In some implementations, the computer system 100 can receive at least a portion of a measured trajectory (i.e., the actual trajectory) of the well being drilled and compare the portion of the measured trajectory with the target trajectory determined during the planning stage. The computer system 100 can determine the revised uncertainty indicator based on the comparison. For example, upon determining that the as-drilled well lands at or near a center of an ellipse, then the computer system 100 can determine that the uncertainty that the well will land in a subsequent ellipse in an undrilled portion is low. Consequently, the computer system 100 can determine the revised ellipse to be smaller than a current ellipse. Alternatively, upon determining that the as-drilled well lands at or near a periphery of the ellipse, the computer system 100 can determine the revised ellipse to be larger than or at least the same size as the current ellipse.

The uncertainty indicator determined during the drilling stage, like the uncertainty indicator determined during the planning stage, can include multiple ellipses, each occupying a different area. Each ellipse is associated with a respective depth of the well from the surface to the subterranean geological target. One or more of the ellipses represents an uncertainty associated with a portion of the well that has not yet been drilled. The computer system 100 can display the multiple ellipses at multiple respective depths of the well in the user interface. In some implementations, the computer system 100 can replace an ellipse at a depth determined during the planning stage with another ellipse at the depth determined during the drilling stage. In this manner, the computer system 100 can replace one or more ellipses at respective one or more depths based on the survey data and the target trajectory. In some situations, the computer system 100 can determine that an ellipse determined during the planning stage matches (e.g., occupies the same area as) an ellipse determined during the drilling stage. In such situations, the computer system 100 may not replace the ellipse determined during the planning stage.

In response to viewing ellipses associated with the revised uncertainty indicator, an operator may change aspects of a survey plan, e.g., to adjust the target trajectory from the as-drilled well and the plan such that the newly updated ellipses land at the geological target. At 408, the computer system 100 can receive a change to the survey plan that indicates the number, position and survey type of surveys to be performed on the well while drilling the well. As described above, the change can be responsive to the uncertainty indicated by the revised uncertainty indicator. For example, upon viewing the revised uncertainty indicator, an operator can determine to change the number, position, survey type, error models (or a combination) that was previously defined in the survey plan. The operator can, e.g., select a survey tool that the operator had not selected during the planning stage before drilling commenced. In some implementations, the computer system 100 can display, in the user interface, multiple survey tools from among which the operator can make one or more selections.

At 410, the computer system 100 can apply multiple error models based on the received change to the survey plan. Each error model defines a respective uncertainty in reaching the subterranean geological target by drilling the well. The uncertainty is based on a survey performed while the well is being drilled as well as the remaining target trajectory. The revised uncertainty indicator represents a combination of the respective uncertainties defined by the multiple error models. A change to an uncertainty defined by one of the error models can affect an uncertainty defined by another of the error models and the revised uncertainty indicator itself. At 412, the computer system 100 can determine such a change to the uncertainty indicator, and, at 414 display the revised uncertainty indicator in the user interface 114.

After the operator has adjusted the survey plan, well drilling can continue. The computer system 100 can continue to receive the survey data and determine the uncertainty indicator. For example, the computer system 100 can receive the data in real time (or near real time) or concurrently with the well drilling (or both). Based on a change or changes to the uncertainty indicator (e.g., if the uncertainty indicator fails to satisfy an uncertainty threshold), the operator can provide changes to the survey plan resulting in the computer system 100 revising the uncertainty indicator. In this manner, during the drilling stage, the computer system 100 can be implemented as a tool that the operator can use to monitor and adjust drilling operations to reach the geological target by implementing as few and as inexpensive survey tools as practicable.

Figure 5:
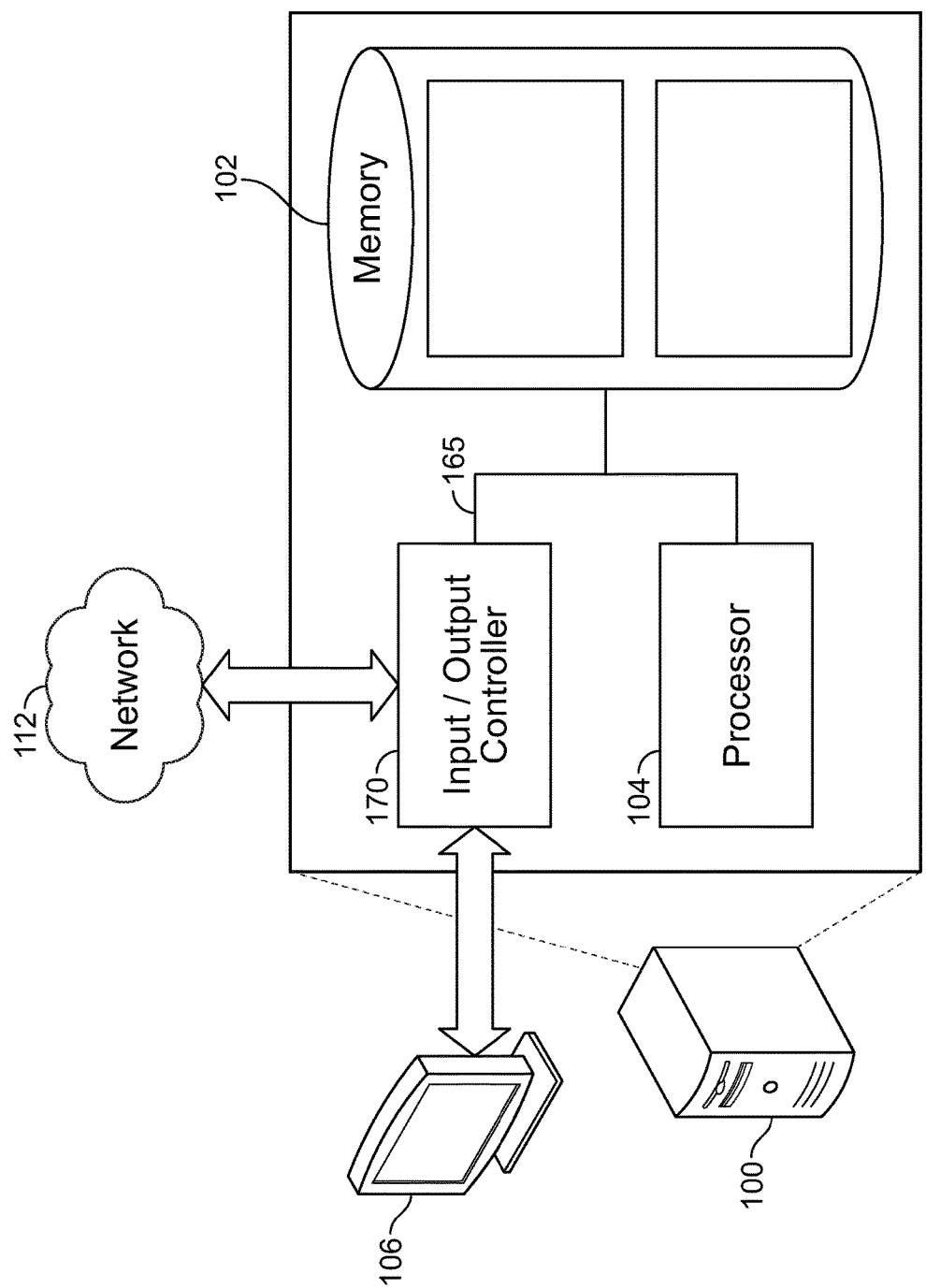
FIG. 5 illustrates an example schematic of the example computer system of FIG. 1.

FIG. 5 illustrates a schematic of the example computer system 100 of FIG. 1. The example computer system 100 can be located at or near one or more wells and/or at a remote location. The example computer system 100 includes a data processing apparatus 104 (e.g., one or more processors), a computer-readable medium 102 (e.g., a memory), and input/output controllers 170 communicably coupled by a bus 165. The computer-readable medium can include, for example, a random access memory (RAM), a storage device (e.g., a writable read-only memory (ROM) and/or others), a hard disk, and/or another type of storage medium. The computer system 100 can be preprogrammed and/or it can be programmed (and reprogrammed) by loading a program from another source (e.g., from a CD-ROM, from another computer device through a data network, and/or in another manner). The input/output controller 170 is coupled to input/output devices (e.g., the display device 106, input devices 108, and/or other input/output devices) and to a network 112. The input/output devices receive and transmit data in analog or digital form over communication links such as a serial link, wireless link (e.g., infrared, radio frequency, and/or others), parallel link, and/or another type of link.

The network 112 can include any type of data communication network. For example, the network 112 can include a wireless and/or a wired network, a Local Area Network (LAN), a Wide Area Network (WAN), a private network, a public network (such as the Internet), a WiFi network, a network that includes a satellite link, and/or another type of data communication network.

A number of implementations have been described. Nevertheless, it will be understood that various modifications may be made without departing from the spirit and scope of the disclosure.

The invention claimed is:

1. A computer-implemented well survey method comprising:

receiving survey data describing a well being drilled from a surface to a subterranean geological target to be reached by drilling the well, wherein the well is associated with a target trajectory on which the well is to be drilled from the surface to the subterranean geological target;

based, at least in part, on the survey data and the target trajectory, determining an uncertainty indicator indicating an uncertainty in drilling the well on the target trajectory;

displaying, in a user interface, the uncertainty indicator;

changing, by an operator, a survey plan that indicates a number, position and type of surveys to be performed on the well while drilling the well, the change being responsive to the uncertainty indicated by the uncertainty indicator; and applying a plurality of error models based on the received change to the survey plan, each error model defining a respective uncertainty in reaching the subterranean geological target by drilling the well.

2. The method of claim 1, wherein the survey data is obtained by a survey tool moved to respective locations in the well being drilled.

3. The method of claim 1, wherein determining the uncertainty indicator based, at least in part, on the survey data and the target trajectory comprises:

receiving at least a portion of a measured trajectory of the well being drilled; and comparing the portion of the measured trajectory and the target trajectory.

4. The method of claim 1, wherein the uncertainty indicator includes a plurality of ellipses, each occupying a different area, each ellipse associated with a respective depth of the well from the surface to the subterranean geological target, the method further comprising displaying the plurality of ellipses at a plurality of respective depths in the user interface.

5. The method of claim 1, wherein the uncertainty indicator is determined for a portion of the well that has not yet been drilled.

6. The method of claim 1, wherein receiving the change to the survey plan comprises receiving a selection of a survey tool from among a plurality of survey tools, the survey tool to be implemented to survey the well to be drilled.

7. The method of claim 6, wherein the survey tool was unselected before displaying the revised uncertainty indicator.

8. The method of claim 1, wherein the uncertainty indicator represents a combination of respective uncertainties defined by each error model of the plurality of error models.

9. The method of claim 8, wherein a respective uncertainty defined by an error model is based on a survey performed while the well is being drilled and is included in the received survey data.

10. A non-transitory computer-readable medium storing instructions executable by data processing apparatus to perform operations comprising:

receiving survey data describing a well being drilled from a surface to a subterranean geological target to be reached by drilling the well, wherein the well is associated with a target trajectory on which the well is to be drilled from the surface to the subterranean geological target;

based, at least in part, on the survey data and the target trajectory, determining an uncertainty indicator indicating an uncertainty in drilling the well on the target trajectory;

displaying, in a user interface, the uncertainty indicator;

changing, from an operator input, a survey plan that indicates a number, position and type of surveys to be performed on the well while drilling the well, the change being responsive to the uncertainty indicated by the uncertainty indicator; and applying a plurality of error models based on the received change to the survey plan, each error model defining a respective uncertainty in reaching the subterranean geological target by drilling the well.

11. The medium of claim 10, wherein the survey data is obtained by a survey tool moved to respective locations in the well being drilled.

12. The medium of claim 10, wherein determining the uncertainty indicator based, at least in part, on the survey data and the target trajectory comprises:

receiving at least a portion of a measured trajectory of the well being drilled; and comparing the portion of the measured trajectory and the target trajectory.

13. The medium of claim 10, wherein the uncertainty indicator includes a plurality of ellipses, each occupying a different area, each ellipse associated with a respective depth of the well from the surface to the subterranean geological target, the operations further comprising displaying the plurality of ellipses at a plurality of respective depths in the user interface.

14. The medium of claim 10, wherein the uncertainty indicator is determined for a portion of the well that has not yet been drilled.

15. A system comprising:

a data processing apparatus; and a medium storing instructions executable by the data processing apparatus to perform operations comprising:

receiving survey data describing a well being drilled from a surface to a subterranean geological target to be reached by drilling the well, wherein the well is associated with a target trajectory on which the well is to be drilled from the surface to the subterranean geological target;

based, at least in part, on the survey data and the target trajectory, determining an uncertainty indicator indicating an uncertainty in drilling the well on the target trajectory;

displaying, in a user interface, the uncertainty indicator;

changing, from an operator input, a survey plan that indicates a number, position and type of surveys to be performed on the well while drilling the well, the change being responsive to the uncertainty indicated by the uncertainty indicator; and applying a plurality of error models based on the received change to the survey plan, each error model defining a respective uncertainty in reaching the subterranean geological target by drilling the well.

16. The system of claim 15, wherein receiving the change to the survey plan comprises receiving a selection of a survey tool from among a plurality of survey tools, the survey tool to be implemented to survey the well to be drilled.

17. The system of claim 16, wherein the survey tool was unselected before displaying the revised uncertainty indicator.

18. The system of claim 15, wherein the uncertainty indicator represents a combination of respective uncertainties defined by each error model of the plurality of error models, and wherein a respective uncertainty defined by an error model is based on a survey performed while the well is being drilled and is included in the received survey data.

* * * * *